United States Patent [19]
Leblans et al.

[11] Patent Number: 5,360,578
[45] Date of Patent: Nov. 1, 1994

[54] PREPARATION OF METAL HALIDE PHOSPHOR PARTICLES OF SELECTED PARTICLE SIZE RANGE WITH IMPROVED POWDER FLOWABILITY

[75] Inventors: Paul Leblans, Berchem; Paul Lardon, Wijnegem, both of

[73] Assignee: AGFA-Gevaert, N.V., Mortsel,

[21] Appl. No.: 198,344

[22] Filed: Feb. 18, 1994

[30] Foreign Application Priority Data

Mar. 9, 1993 [EP] European Pat. Off. ........ 93200668.7

[51] Int. Cl.$^5$ .............................................. C09K 11/61
[52] U.S. Cl. ............................................... 252/301.4 H
[58] Field of Search .................................. 252/301.4 H

[56] References Cited

U.S. PATENT DOCUMENTS

| | | | |
|---|---|---|---|
| 3,988,252 | 10/1976 | Ferretti ......................... | 252/301.4 H |
| 4,261,854 | 4/1981 | Kotera et al. ................. | 252/301.4 H |
| 4,897,217 | 1/1990 | Jackson et al. .............. | 252/301.4 H |
| 5,227,254 | 7/1993 | Brixner et al. ................ | 252/301.4 H |

Primary Examiner—Jack Cooper
Attorney, Agent, or Firm—Breiner & Breiner

[57] ABSTRACT

A method for preparing metal halide phosphor particles, e.g. barium- and/or strontium-containing halide phosphor particles, of a selected particle size range with improved powder flowability which method comprises the following steps:

(1) firing the raw mixture materials of said phosphor to produce a sintered phosphor mass that is pulverized, (2) mixing said pulverized phosphor mass, optionally after one or more firings, in a liquid mainly containing a water-miscible organic solvent with an organic acid dissolved therein, said acid being capable of forming with metal contained in the phosphor a salt the solubility of which in water at 20° C. is less than 0.5 g per 100 ml, and (3) subjecting the thus treated phosphor particles in wet and/or in dry state to a separation treatment to collect phosphor particles having a grain size smaller than 40 μm but larger than 2 μm.

10 Claims, 1 Drawing Sheet

PREPARATION OF METAL HALIDE PHOSPHOR PARTICLES OF SELECTED PARTICLE SIZE RANGE WITH IMPROVED POWDER FLOWABILITY

DESCRIPTION

1. Field of the Invention

The present invention relates to a method for preparing metal halide phosphor particles of a selected particle size range having their surface coated for improving their flowability, i.e. powder fluidity, and also relates to the use of said phosphor particles in the production of radiographic phosphor screens.

2. Background of the Invention

In radiography the interior of objects is reproduced by means of penetrating radiation, which is high energy radiation also known as ionizing radiation belonging to the class of X-rays, gamma-rays and high-energy elementary particle radiation, e.g. beta-fays, electron beam or neutron radiation. For the conversion of penetrating radiation into visible light and/or ultraviolet radiation luminescent materials, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation-the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals. Photostimulable phosphors for use in said recording system and-disclosed in said US-P are e.g. cerium and samarium activated strontium sulphide and europium and samarium activated strontium sulphide.

In U.S. Pat. No. 3,175,084 alkali metal halides and alkaline earth metal halides activated with an element from any of the Groups I, II, and III of the Periodic Table of Elements have been described as X-ray storage phosphors that are photostimulable with visible and infrared light.

Of special interest as luminescent materials are divalent europium doped alkaline earth metal fluorohalides as defined e.g. in United Kingdom patent specification 1,419,169 describing their use in classical X-ray intensifying screens.

Particular barium fluorohalide phosphors identified in U.S. Pat. No. 4,239,968 are claimed for recording and reproducing a radiation image comprising the steps of (i) causing said phosphors to absorb a radiation passing through an object, (ii) stimulating said phosphors with stimulation rays selected from visible rays and infrared rays having a wavelength not smaller than 500 nm in order to release the energy of the radiation stored in said phosphors as fluorescent light.

Said barium fluorohalide phosphors are within the scope of the following empirical formula:

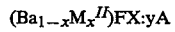

$$(Ba_{1-x}M_x^{II})FX:yA$$

wherein:

$M^{II}$ is one or more of Mg, Ca, St, Zn and Cd;

X is one or more of Br, Cl or I;

A is at least one member of the group consisting of Eu, Tb, Ce, Tm, Dy, Pr, Ho, Nd, Yb and Er; and x is in the range $0 \leq x \leq 0.6$ and y is in the range $0 \leq y \leq 0.2$.

In said phosphors as well as in the phosphors exemplified in the already mentioned United Kingdom patent specification 1,419,169 the fluoride content is stoichiometrically equal to the content of the other halide(s), chloride, bromide and/or iodide, so that said phosphors have the tetragonal crystal structure of PbFCl.

Alkaline earth fluorohalide phosphors wherein the fluorine-containing portion is superstoichiometrically present with respect to the other halogen portion are described e.g. in published EP-A 0 021 342; 0 345 903; 0 345 904; 0 345 905 and U.S. Pat. No. 4,587,036. A BaF-Ci:Eu$^{2+}$ phosphor is moisture sensitive and by the attraction of water vapour, e.g. from the air, will loose its luminescence. Such can be learned from U.S. Pat. No. 4,138,361 and the periodical Medica Mundi, 20 (1975) No. 1 "New Phosphors for X-ray Screens" by A.L.N. Stevels, page 17. It has been stated experimentally that the moisture sensitivity of BaFBr:Eu$^{2+}$ is still worse and such is also the case for BaI$_2$:Eu$^{2+}$ described in JP (Kokai) 04/126,791.

Other moisture-sensitive photostimulable halide phosphors mainly contain an alkali metal as host metal, particularly Rb or Cs, either or not in combination with an alkaline earth metal, e.g. barium and strontium, and are doped e.g. with thallium, as described in U.S. Pat. No. 5,028,509.

According to U.S. Pat. No. 4,138,361 in order to remedy for moisture sensitivity halide-containing phosphor particles are admixed or combined with or have reacted with at least one metal-organic substance such that the fluorescence power of said phosphor particles is less liable to be adversely affected by moisture. Suitable metal-organic substances for said purpose are water-insoluble metal carboxylates, water-insoluble mercaptides, and organo-metallic compounds selected from the group consisting of organoantimony, organobismuth and organotin. According to EP 0 000 961 (see also U.S. Pat. No. 4,180,740) halide-containing phosphor particles in order to become less liable to be adversely affected by moisture are admixed with, combined in contact or have reacted with at least one organic compound corresponding to one of the following general formulae:

$$R-X \text{ and } X-R^1-X$$

wherein:

R represents a monovalent organic group,

R$^1$ represents a bivalent organic group, with the proviso that these R and R$^1$ groups do not contain reactive hydrogen such as contained in X, and X represents a group containing reactive hydrogen, e.g. is a carboxyl group.

According to the Examples of said EP and US patent specification said compounds improving the stability against moisture of the halide-containing phosphor are added to the phosphor-binder coating composition wherefrom the X-ray screen layer is coated.

From U.S. Pat. No. 4,539,138 can be learned that it is difficult to obtain rare earth element activated divalent metal fluorohalide phosphor having high powder fluidity. In order to improve the powder fluidity and to prevent the sintering a rare earth element (Ln) activated divalent metal fluorohalide during the firing step of the raw mixture materials of the phosphor contains a certain amount of silica (SiO$_2$). A phosphor represented by following formula is produced:

$$M^{II}FX.xSiO_2:yLn$$

The presence of colloidal silica (7 nm size according to Example 1 of said U.S. Pat. No.) in the mixture of raw materials improves the powder fluidity of said mixture and later on of the prepared phosphor which contains SiO$_2$ as a constituent also lowering the hygroscopicity of the phosphor.

By the fact that the silica has the property of preventing the sintering of the phosphor mass during its firing the phosphor could be prepared without pulverizing and classifying step.

However, it has been proven experimentally that the particle size of a photostimulable phosphor is particularly important with regard to its luminance obtained by photostimulation and that Eu$^{2+}$ doped alkaline earth fluorohalide phosphors with a particle size smaller than 40 μm offer better luminance results than coatset particles when applied in a binder layer. The separation of phosphor particles having a particle size smaller than 40 μm from coatset particles obtained after firing by pulverizing the sintered phosphor mass requires classification, i.e. a separation treatment wherein the coarser phosphor particles are removed. On the other hand, it is also important to remove the fraction of very fine particles from the phosphor powder before making a screen. The reason therefor is that phosphor particles sizing smaller than 2 to 3 μm generally have a very low intrinsic sensitivity and give rise to strong scattering of the light, thereby further reducing the light output of the phosphor screen. The separation of said fine particles is particularly difficult when the phosphor particles are hygroscopic and by the attracted water stick to the coatset particles. Classification of phosphor particles obtained by pulverization of a fired and sintered phosphor mass can only proceed efficiently when the individual phosphor particles do not stick or agglomerate together and powder fluidity is high.

Objects and Summary of the Invention

It is an object of the present invention to provide a process for the production of metal halide phosphor particles, e.g. barium and/or strontium-containing halide phosphor particles, for application in radiographic screens, wherein the dispersibility of said particles in organic medium is improved and their classification according to individual particle size is not hindered by agglomeration.

It is a particular object to produce photostimulable phosphor screens or panels containing photostimulable barium-and/or strontium fluorohalide phosphor particles having improved light output on photostimulation.

Other objects and advantages of the present invention will become apparent from the further description and examples.

According to the present invention a method for preparing metal halide phosphor particles, e.g. barium-and/or strontium-containing halide phosphor particles, of a selected particle size range is provided, which method comprises the steps of:

1) firing the raw mixture materials of said phosphor to produce a sintered phosphor mass that is pulverized, (2) mixing said pulverized phosphor mass, optionally after one or more further firings, in a liquid mainly containing a water-miscible organic solvent with an organic acid dissolved therein, said acid being capable of forming with metal contained in the phosphor a salt the solubility of which in water at 0° C. is less than 0.5 g per 100 ml, preferably less than 0.01 g per liter, and (3) subjecting the thus treated phosphor particles in-wet and/or in dry state to a separation treatment in order to collect phosphor particles having a grain size smaller than 40 μm but larger than 2μm, preferably within the particle size range of 5 to 20 μm.

Detailed Description of the Invention

Organic acids that satisfy the above defined specifications are e.g. monocarboxylic aliphatic acids containing at least 8 carbon atoms, preferably lauric acid, myristic acid, palmitic acid, stearic acid, benenic acid, oleic acid and linoleic acid.

Other useful acids are bivalent carboxylic acids meeting the above solubility requirement for their barium- or strontium salt, e.g. succinic acid, adipic acid and tartaric acid. The present invention includes the use of mixtures of acids fulfilling the-above requirements.

Organic solvents suitable for use according to the present invention in the defined-phosphor treatment are lower (C1-C4) alcohols and ketches, preferably ethanol and methyl ethyl ketone. In the treatment according to the present invention said solvents may be mixed with water, e.g. water may be present up to 20 % by volume to the total liquid mass.

Said separation treatment wherein phosphor powders containing particles of different particle size are separated into fractions proceeds e.g. by sieving, sedimentation and/or classification by the action of a stream of fluid, i.e. gas or liquid.

The most widely used separation method for dry powders is by sieving. This technique requires relatively simple equipment but sieves are only effective separators unless properly agitated and operated with non-caking powders since otherwise sieves with the finer meshes are clogged and damaged.

According to a first embodiment for batch-wise separating dry phosphor particles treated by organic acid into fractions a batch of said phoshor particles is put onto the uppermost sieve of a vertically arranged stack of sieves wherein the openings of the sieves are diminishing in size from the top downward and a solid bottom retains the final undersize. Powders are segregated according to the desired size by shaking the stack of sieves in the direction perpendicular to the sieve openings, e.g. .with a mechanical vibrator or with air pulses of sonic frequency until all particles fall onto sieves through which they are unable to pass, the finest fraction (undersize fraction) being collected by a bottom pan.

Wet-sieving is performed with a stack of sieves in a similar manner except that the phosphor particles are still present in said organic liquid having said organic acid dissolved therein. The dispersion of the phosphor particles being greatly improved by the adsorption of said organic acid prevents said particles from agglomerating and promotes especially the passage of the finer particles through the smaller sieve openings without clogging.

The use of said stack of sieves in dry as well as in wet-sieving is described and illustrated in Kirk-Othmer's "Encyclopedia Chemical Technology" Third Edition Volume 21 (1983) pages 114-115.

According to a second powder separation embodiment that may be operated continuously a series of sieves arranged in a slanted plane with respect to the field of earth-gravity is used. Each-sieve has a different opening size and the sieve of smaller sieve openings is at the input side of-the powder and the sieve with the largest sieve openings at the output side. The series of sieves is vibrated up and down while the powder mass moves downwardly the Slope formed by the series of sieves. Several reception pans receive the powder fractions passing through the sieve openings. The powder received at the output may be recycled over the series of sieves till the output fraction substantially consists of the non-selected coarser fraction.

According to a third powder separation embodiment that may be combined with the separation by sieving, the finer dry phosphor fraction is removed by classification with air classifier (windsifter) as described e.g. in FIG. 2 on page 168 of McGraw-Hill Encyclopedia of Science and Technology (1977) by McGraw-Hill, Inc.

According to a fourth embodiment the finer (non-desired undersize fraction) fraction of phosphor particles is separated before drying the phosphor particles by subjecting the phosphor particles of different size treated with said organic acid in the organic carrier liquid to gravitational or centrifugal acceleration allowing the coarser particles to concentrate by sedimentation or accumulation in a narrow liquid band while the liquid part containing the smaller particles is removed continuously.

The method of the present invention is particularly useful in the preparation of barium and/or strontium-containing fluorohalide phosphor particles.

High photostimulability is obtained with $Eu^{2+}$ doped barium(strontium) fluorobromide phosphors, wherein optionally a minor part (less than 50 atom %) of the bromine is replaced by chlorine, and/or iodine.

Preferably in said barium(strontium) fluorohalide phosphors fluorine is present in a 3 to 12 atom % in excess over bromine or bromine combined with chlorine and/or iodine.

Examples of preferred phosphors are within the scope of the following empirical formula:

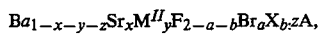

wherein:
$M^{II}$ is at least one member selected from the group consisting of Mg and Ca;
X is at least one member selected from the group consisting of Cl and I;
x is in the range $0 \leq x \leq 0.55$;
y is in the range $0 \leq y < 0.05$;
a+b is smaller than 1,
a is in the range $0.70 \leq a \leq 0.96$,
b is in the range $0 \leq b < 0.15$;
z is in the range $10^{-6} \leq z \leq 10^{-2}$,
A is $Eu^{2+}$ or $Eu^{2+}$ together with one or more of the co-dopants selected from the group consisting of $Eu^{3+}$, Y, Tb, Ce, Tm, Dy, Pt, Ho, Nd, Yb, Er, La, Gd and Lu, Photostimulable barium(strontium) fluorohalide phosphor particles prepared according to the present invention include phosphor compositions containing an alkali metal selected from the group consisting of Li, Na, K, Rb and Cs, with respect to barium preferably in an atom percent in the range of $10^{-2}$ to 1 at%.

The preferred alkali metal for in, proving the erasability of energy stored in said phosphors is cesium. Lithium is preferred for shifting the stimulation maximum to the shorter wavelengths.

Preferred photostimulable phosphor particles prepared according to the present invention contain Sr with respect to barium in an atom percent in the range of $10^{-1}$ to 20 at%. By the presence of strontium and fluorine in excess the X-ray conversion efficiency (C.E.) of the phosphor is increased markedly (ref. published EP-A 0 345 903).

In preferred phosphors according to said empirical formula containing strontium in combination with barium the value "x" is preferably in the range $0.16 \leq x \leq 0.19$ for $0.86 \leq a \leq 0.93$.

In preferred phosphors according to said empirical formula "z" is in the range $10^{-4} < z \leq 10^{-2}$.

Said phosphors can be prepared by using-as starting materials (raw mix) in the firing:
(1) barium fluoride;
(2) ammonium bromide;
(3) optionally barium halide (except barium fluoride),
(4) an alkali metal compound, e.g. lithium fluoride, lithium, chloride, lithium bromide, lithium iodide, sodium fluoride, sodium chloride, sodium bromide, potassium fluoride, rubidium fluoride, cesium fluoride, lithium hydroxide or oxide or lithium carbonate;
(5) a strontium halide, optionally in admixture with a calcium and/or magnesium halide;
(6) a halide or an oxide or salt thermally decomposable into oxide, e.g. nitrate, of at least one of the elements enumerated under A except for Eu; and
(7) at least one europium containing compound selected from the group consisting of europiumhalide, europium oxide, europiumnitrate and europium sulphate, preferably $EuF_3$ that is reduced to yield $Eu^{2+}$ ions during firing in a reducing atmosphere.

Firing proceeds preferably in the temperature range of 700to 1000° C. The firing may proceed in several stages e.g. when using an oxide as described in U.S. Pat. No. 4,532,071.

According to a particular example the preparation of a fired phosphor mass proceeds as follows:
a raw mix of 0,859 mol of $BaF_2$, 0.14 mol of $SrF_2$, 1 mol of $NH_4Br$ and 0.001 mol of $EuF_3$ was prepared under grinding conditions. The thus obtained raw mix was then fired at a temperature between 700 and 1000° C. in a reducing atmosphere. The firing lasted at least 3 h but may proceed up to 10 h.

The reducing atmosphere consists preferably of a mixture of hydrogen with inert gas, e.g. argon or nitrogen or is formed in situ by reaction of charcoal and water vapour to form a mixture of hydrogen and carbon monoxide or hydrogen and carbon dioxide. In the reducing atmosphere most or all of the trivalent-europium present reduced to divalent europium.

After the firing is completed the product obtained forms a sintered mass that after cooling is pulverized (crushed) e.g. in a mortar, and may be subjected to further firings. Multiple firing may be advantageous to improve the homogeneity and stimulation properties of the phosphor.

Suitable binders for forming a binder layer incorporating said phosphor in dispersed form are film forming organic polymers, e.g. a cellulose acetate butyrate, polyalkyl (meth) acrylates, e.g. poly(methyl methacrylate), a polyvinyl-n-butyral e.g. as described in the U.S. patent specification No. 3,043,710, a copoly(vinylacetate/vinyl chloride) and a copoly(acrylonitrile/butadiene/styrene) or a copoly(vinyl chloride/vinyl acetate/vinyl alcohol) or mixture thereof.

Preferably a minimum amount of binder is employed to obtain a high X-ray energy absorption. However, a very small amount of binding agent may result in a too brittle layer, so a compromise has to be made. The coverage of the phosphor is preferably in the range from about 300 to 1500 g/m2. The thickness of the phosphor layer is preferably in the range of 0.05 to 0.5 mm.

According to a preferred embodiment the phosphor layer is used as a supported layer on a support sheet. Suitable support materials are made of a film forming organic resin, e.g. polyethylene terephthalate, but paper and cardboard supports optionally coated with a resin layer such as an alpha-olefinic resin layer are also particularly useful. Further glass and metal supports are used in certain circumstances, the latter preferably of high atomic weight, as described e.g. in U.S. Pat. Nos. 3,872,309 and 3,389,255, for use in industrial radiography (non-destructive testing).

According to a particular embodiment for industrial radiography the image-sharpness of the phosphor screen is improved by incorporating in the phosphor screen between the phosphor-containing layer and the support and/or at the rear side of the support a pigment-binder layer containing a non-fluorescent pigment being a metal compound, e.g. salt or oxide of lead, as described in Research Disclosure September 1979, item 18502.

For the preparation of the photostimulable phosphor screen the phosphor particles are intimately dispersed in a solution of the binder using an organic solvent, e.g. 2-methoxy-propanol or ethyl acetate, and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

Solvent-less coating may be carried out by using UV or electron beam (EB) curable binder compositions as described e.g. in Research Disclosure December 1977, item 16435.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per Cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles-as described e.g in U.S. Pat. No. 3,023,313, or it may be made of a vapour-deposited metal layer, e.g. an aluminum layer, or it may be a coloured pigment layer absorbing stimulating. radiation but reflecting the emitted light as described e.g. in U.S. Pat. No. 4,380,702.

Optionally a light-absorbing layer is provided between the phosphor-containing layer and its support or in the support itself to avoid reflection and scattering of light at the interface of the support and the phosphor-containing layer, thereby increasing the image resolution of the photostimulable phosphor screen.

Since in the above described X-ray recording system operating with photostimulable radiographic screens the screens are used repeatedly, it is important to provide them with an adequate topcoat for protecting the phosphor-containing layer from mechanical and chemical data age. This is particularly important for photostimulable radiographic screens where each screen normally is not encased in a cassette.

A protective layer can be coated onto the phosphor containing layer by directly applying thereto a coating solution containing a film-romping organic solvent-soluble polymer such as nitrocellulose, ethylcellulose or cellulose acetate or poly(meth) acrylic resin and removing the solvent by evaporation. According to another technique a clear, thin, tough, flexible, dimensionally stable p0lyamide film is bonded to the phosphor layer (see published EP-A 00 392 474).

According to a further known technique a protective overcoat is produced with a radiation-curable composition. Use of a radiation curable coating as protective toplayer in a X-ray conversion Screen is described e.g. in EP 209 358 and JP 86/176900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

According to a preferred embodiment the photostimulation of the phosphor-binder layer that has been image-wise or pattern-Wise exposed with X-rays proceeds with a scanning laser beam.

Preferred light sources for producing stimulation light in the wavelength range of 600 to 1000 rm are the helium-neon laser (633 nm) and short infra-red light emitting semi-conductor lasers, e.g. emitting between 760 and 1000 nm.

Preferred light sources for producing stimulation light in the wavelength range of 440 nm to 550 nm are the frequency doubled (532 nm) solid state Nd-YAG laser, an argon ion laser wherefrom either the 488 nm line or 514 nm emission line is used, and a He-Cd laser emitting at 442 nm.

Suitable filter means for separating the stimulation light from the stimulating light can be cut-off filters, transmission bandpass filters and band-reject filters. A survey of filter types and spectral transmittance classification is given in SPSE Handbook of Photographic Science and Engineering, Edited by Woodlief Thomas, Jr. - A Wiley-Interscience Publication - John Wiley & Sons, New York (1973), p. 264–326.

Shortwave pass filters that transmit the shorter wavelengths and reject the longer-wavelengths are listed in Table 4.12 of said SPSE Handbook.

Bandpass filters that transmit or reject only a lighted band of wavelengths are listed in Tables 4.13 and 4.14 respectively. Tables of many selected long-wave, short-wave pass, and bandpass filters, both liquid and solid, for wavelengths from 150 to 3500 nm, are given by W. Summer, Photo Sensitors, Chapman & Hall, London, 1957, chap. 9.

The light emitted by photostimulation (called stimulated emission light) is detected preferably photo-electronically with a transducer transforming light energy into electrical energy, e.g. a phototube (photomultiplier) providing sequential electrical signals that can be digitized and stored. After storage, these signals can be subjected to digital processing. Digital processing includes image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversion of the electrical signals corresponding with the light obtained through photostimulation are displayed on a cathode-ray tube. Before display the signals may be processed by computer. Conventional image processing-techniques can be applied to reduce the signal-to-noise ratio of the image and enhance the image quality of coarse or fine image features of the radiograph.

On the phosphors of the present invention measurements have been carried out to determine their photophysical properties.

In one measurement the total photostimulable energy stored upon exposure to a given X-ray dose is determined. Prior to X-ray excitation any residual energy still present in the phosphor screen is removed by irradiation. To avoid photoexcitation during erasure a cut-off Schott GG435 filter, which eliminates all wavelengths below 435 nm, is placed between a lamp emitting photostimulating light and the phosphor screen. The phosphor screen is then excited with an X-ray source operating at 85 kVp and 20 mA. For that purpose the MONODOR X-ray source of Siemens AG.- W.Germany has been used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The photostimulating light used in these measurements was 633 nm He-Ne laser light.

The laser-optics comprise an electronic shutter, a bee-expander and two filters. A photomultiplier (Hamamatsur 1398) collects the light emitted by the photostimulation and gives a corresponding electrical current. The measurement procedure is controlled by a Hewlett Packard HP 9826 computer connected to a HP 6944 multiprogramer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen an area of only 7 mm2 is exposed. Only half of the laser power reaches the screen surface. In this way the intensity of the stimulating beam is more uniform. A red filter (3 mm SCHOTT OG 590) placed immediately in front of the laser eliminates the weak ultraviolet components in the He-Ne laser emission. The signal amplitude from the photomultiplier is linear with the intensity of the photostimulating light and with the released photostimulable energy. The signal decreases gradually following a power function. When the signal curve is entered the oscilloscope is triggered a second time-to measure the offset which is defined as the component of error that is constant and independent of inputs. After subtracting this-offset the point at which the signal reaches 1/e of the maximum value is calculated. The integral below the curve is then calculated from the start to this 1/e point. The function is approximated mathematically by $f(t) = A.e^{-t/\tau}$: wherein A is the signal amplitude, $\tau$ is the time constant, t is the stimulation time, and e is the base number of natural logarithms. At $t=\tau$ 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has been calculated.

Because the emitted stimulation light is scattered in all directions only a fraction of said light is detected by the photomultiplier. The positions of the panel and photomultiplier are such that 10% of the total emission is detected by the photomultiplier.

After all these corrections have been made a value for conversion efficiency (C.E$_1$.) is obtained expressed in pJ/mm$^2$/mR. To correct for the the total quantity of phosphor irradiated with X-rays, this value is divided by the screen thickness to yield a conversion efficiency (C.E.) expressed in pJ/mm$^3$/mR. This value varies with screen thickness and therefore for measurements to be comparable they have to be carried out at constant phosphor coverage.

The stimulation energy (S.E.) is defined as the laser-energy necessary to release 63% of the stored energy and is expressed $\mu J/mm^2$.

The sensitivity of the X-ray image recording phosphor material is directly proportional to the signal amplitude A upon photostimulation of the emission intensity versus time and may-be expressed by the ratio of C.E. to S.E. Said ratio expressed in units of $10^{-9}$/mR/mm is called here the figure of merit (F.O.M.) and is calculated by the already mentioned equation:

$$F.O.M. = 1000 \times C.E./S.E.$$

The F.O.M. is directly proportional to the initial stimulated light emission intensity upon laser stimulation divided by the laser power and the applied X-ray dose, and is therefore a measure of the sensitivity of the photostimulable storage phosphor.

11

Figure 1:
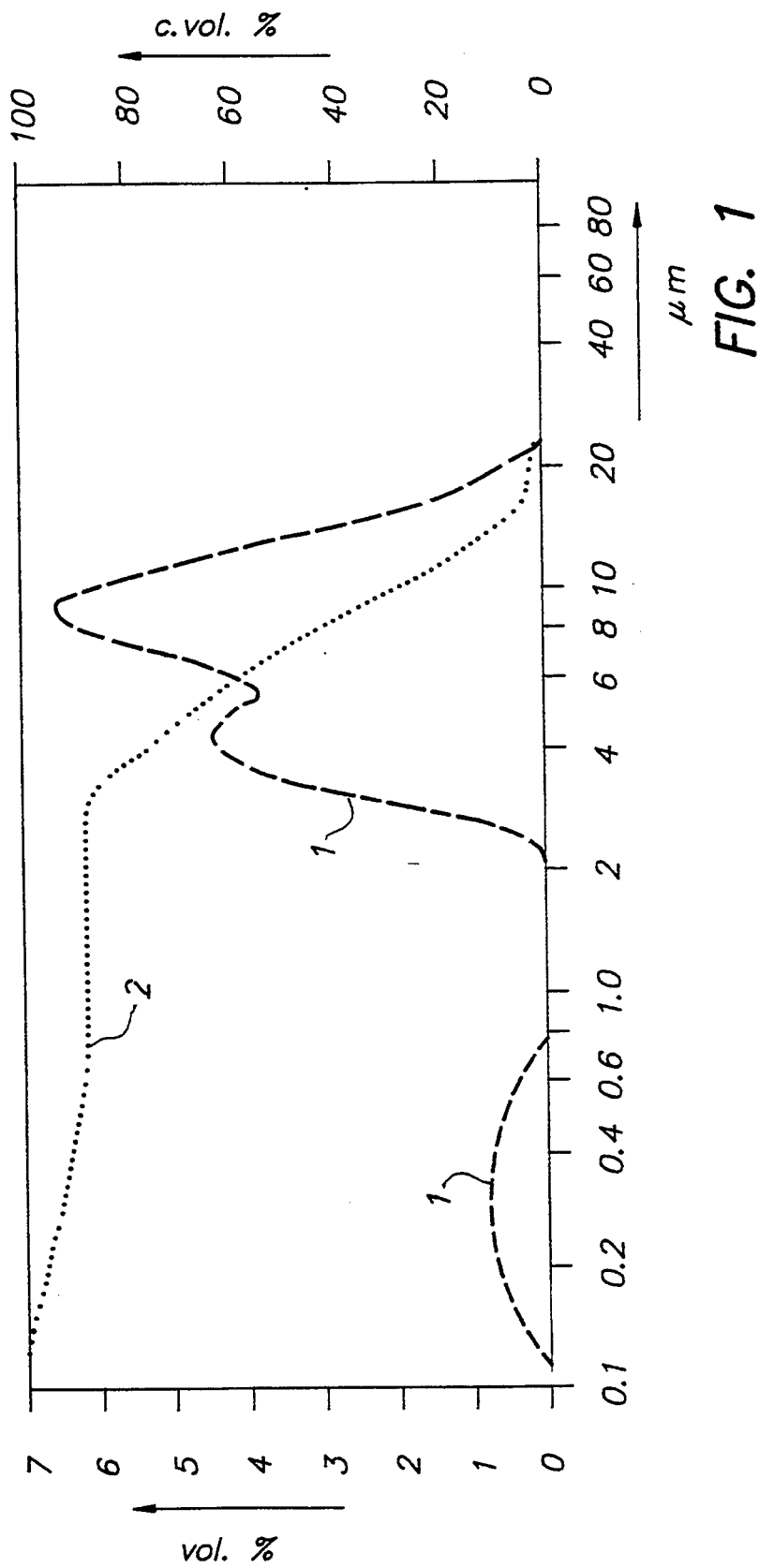
FIG. 1 is a graph showing a particle size distribution and, specifically, a differential and cumulative particle size distribution of the fine fraction after classification.

The following examples illustrate the present invention without however limiting it thereto.

INVENTION EXAMPLES 1 to 7 and COMPARATIVE EXAMPLE A

A raw mix was prepared with the empirical composition:

$$Ba_{0.858}Sr_{0.141}Eu_{0.001}F_{1.0147}Br_{0.9853}$$

For this purpose a mixture of $BaF_2$, $SrF_2$ and $EuF_3$ in an amount of 1 kg were placed in a 1.5 1 PE-bottle containing 40 nun diameter agate balls. The bottle was shaken on a TURBULA (tradename of Willy A. Bachofen AG Maschinenfabrik, Switzerland) mixer for 30 minutes at 44 rpm and the required mount of $NH_4Br$ for replacing fluoride ions by bromide ions was introduced for still obtaining an excess of fluoride in the final phosphor. The ingredients were mixed again for 10 minutes and put in a jar rolling mill rotating at an angular speed of 41 rpm.

The obtained mixture was divided in fractions of 165 g and each fraction was milled in the rotating ball mill in a 500 ml agate container in the presence of 15 agate balls of 20 mm diameter such for 10 minutes at 41 rpm.

The first firing of said raw mixture materials was carried out on a 550 g batch in a tube furnace in a 100% argon gas atmosphere at a gas flow rate of 72 1/h. The firing temperature was 850° C. and the firing time was 2 hours and 40 minutes. The resulting material was milled in such a way that the average particle size was 10 μm. Subsequently the powder was classified in a coarse and fine fraction by air classification and the fine fraction having a particle size distribution as shown in FIG. 1 was fired again.

FIG. 1 shows differential and cumulative particle size distribution of the fine fraction after classification. Graph 1 (dotted line) represents a particle size distribution curve curve having in the ordinate at the left the volume percentage (vol. %) of particles corresponding to a specific particle diameter in μm read on the abscissa. Graph 2 (broken line) represents a cumulative particle size distribution having in the ordinate at the right the cumulative volume percentage (c. vol. %) of particles with a diameter larger than a specific value in μm read on the abscissa. The average particle size of the phosphor powder is about 7 μm, which makes it very cohesive.

The second firing proceeded on a 500 g batch in a tube furnace under 99.8% by volume of nitrogen gas and 0.2% by volume of hydrogen gas at a flow rate of 60 1/h. The firing temperature was 750° C. and the firing time was 4 h. After firing and cooling to room temperature the sintered powder mass was ground in a mortar.

EXAMPLE 1

100 g of the thus obtained phosphor powder mass was dispersed in 425 ml of a 0.01 molar solution of lauric acid in an ethanol-water mixture containing ethanol and water in 80/20 by volume ratio. The dispersion was stirred vigourously for 2 hours.

The powder was then allowed to settle and the supernatant liquid was removed. The remaining powder was stirred again in 425 ml of pure ethanol and allowed to settle again whereupon after removing the supernatant liquid it was dried at 60° C.

EXAMPLE 2

The Example 1 procedure was repeated with the difference however, that a 0.03 molar solution of lauric acid was used.

EXAMPLE 3

The Example 1 procedure was repeated with the difference however, that a 0.01 molar solution of myristic acid was used.

EXAMPLE 4

The Example 1 procedure was repeated with the difference however, that a 0.03 molar solution of myristic acid was used.

EXAMPLE 5

The Example 1 procedure was repeated with the .difference however, that a 0.01 molar solution of palmitic acid was used.

EXAMPLE 6

The Example 1 procedure was repeated with the difference however, that a 0.03 molar solution of palmitic acid was used.

EXAMPLE 7

The Example 1 procedure was repeated with the difference however, that a 0.03 molar solution of stearic acid was used.

COMPARATIVE EXAMPLE A

The Example 1 procedure was repeated with the difference however, that the ethanol-water mixture was free from any organic acid.

The sievability of the thus prepared phosphor powders of Examples 1 to 7 and of the Comparative Example A was determined in the following way: of each of said dried phosphors prepared according to the above example procedures 100 g were put on a 45 μm-mesh sieve of the automatic sieving device DEMI FINEX (tradename of Russell Finex Ltd., London - U.K.). The amount (yield) in gram of phosphor having passed through the sieve within a period of 3 minutes of sieving is mentioned by percentage (%) in the following Table 1. The higher that percentage the better the sievability and flowabillty of the prepared phosphor-powder.

A same amount of phosphor powder of each of said Examples after passing through said sieve was then dispersed in a binder solution containing cellulose acetobutyrate dissolved in methyl ethyl ketone. The dispersions obtained were coated separately at a same coverage of 500 g of phosphor per m² onto a 100 μm thick transparent sheet of polyethylene terephthalate. The dried screens were then used to determine the energy storage characteristics of the phosphors.

After erasing any stored energy by UV and visible light exposure the screens were each under the same conditions irradiated with a same dose of X-rays and then stimulated with 633 nm light of He-Ne laser.

The F.O.M. was determined as described hereinbefore and the obtained values are mentioned in the following Table 1.

TABLE 1

| | Yield % | F.O.M. $10^{-9}$/mR/mm |
|---|---|---|
| Phosphor of | | |

TABLE 1-continued

| Example No. | Yield % | F.O.M. $10^{-9}$/mR/mm |
|---|---|---|
| 1 | 90.2 | 2,550 |
| 2 | 86.8 | 2,650 |
| 3 | 87.5 | 2,670 |
| 4 | 83.8 | 2,590 |
| 5 | 94.3 | 2,460 |
| 6 | 82.2 | 2,590 |
| 7 | 81.6 | 2,550 |
| Phosphor of Comparative Example A | 59.4 | 2,420 |

INVENTION EXAMPLES 8 and 9 and COMPARATIVE EXAMPLE B

Example 8

100 g of the phosphor powder mass used in Example 1 was dispersed in 425 ml of a 0.03 molar solution of adipic acid in an ethanol-water mixture containing ethanol and water in 80/20 by volume ratio. The dispersion was stirred vigourously for 2 hours.

The powder was then allowed to settle and the supernatant liquid was removed. The remaining powder was stirred again in 425 ml of pure ethanol and allowed to settle again whereupon after removing the supernatant liquid it was dried at 60° C.

Example 9

The Example 8 procedure was repeated but instead of adipic acid a same molar amount of succinic acid was used.

COMPARATIVE EXAMPLE B

The Example 8 procedure was repeated with the difference, however, that the ethanol-water mixture was free from any organic acid.

The phosphor samples obtained according to said Examples 8 and 9 and Comparative Example B were sieved manually over a 38 μm mesh sieve. The percentage by weight of phosphor powder having passed through the sieve within a period of 1 minute is given in the following Table 2.

TABLE 2

| Phosphor of Example No. | Yield % |
|---|---|
| 8 | 51.7 |
| 9 | 24.5 |
| Phosphor of Comparative Example B | 19.3 |

INVENTION EXAMPLE 10 and COMPARATIVE EXAMPLE C

A raw mix was prepared with the empirical composition:

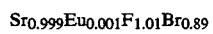
$Sr_{0.999}Eu_{0.001}F_{1.01}Br_{0.89}$

For this purpose in a box furnace $SrBr_2.6H_2O$ was tried at 500° C. for 2 hours in the presence of 5 mole % of $NH_4Br$. The dried powder was ground in a mortar.

A mixture was made of the thus dried $SrBr_2$ with $SrF_2$ and $EuF_3$ to obtain the above defined raw mix. Said mixture was placed in a 200 ml PE-bottle, which was shaken on a TURBULA (tradename) mixer for 30 minutes at 44 rpm. Subsequently, the mixture was milled for 10 minutes at 290 rpm in a rotating ball milling a 250 ntl agate container in the presence of 18 agate balls of 10 nun diemeter.

The first firing of said raw mixture materials was carried out in a tube furnace in a reducing atmosphere of 99.8 vol. % of nitrogen gas and 0.2 vol. % of hydrogen at a gas flow rate of 60 l/h. The firing temperature was 890° C. and the firing time was 2 hours. The fired phosphor mass was cooled and ground in mortar with pestle. A second firing identical to the first one was performed for 2 hours and the fired mass was ground again.

Finally, the powder was refired in said reducing atmosphere at a temperature of 730° C. for 90 minutes and ground as before in a mortar with pestle.

EXAMPLE 10

20 g of the thus obtained phosphor powder was dispersed in 100 ml of a 0.03 molar solution of palmitic acid in an ethanol-water mixture containing ethanol and water in 99.5/0.5 by volume ratio. The dispersion was stirred vigourously for 2 hours.

The powder was then allowed to settle and the supernatant liquid was removed. The remaining powder was stirred again for 15 minutes in 100 ml of pure ethanol and allowed to settle again whereupon after removing the supernatant liquid it was dried at 60° C.

COMPARATIVE EXAMPLE C

The Example 10 procedure was repeated with the difference however, that the ethanol-water mixture was free from any organic acid.

20 g of the phosphor samples obtained according to said Example 10 and Comparative Example C was sieved manually over a 38 μm mesh sieve. The percentage by weight of phosphor powder that has passed through said sieve after 1 minute is given in the following Table 3.

TABLE 3

| | Yield % |
|---|---|
| Phosphor of Example No. 10 | 46.3 |
| Phosphor of Comparative Example C | 10.3 |

EXAMPLE 11

A phosphor batch was produced in the way described in Example 1 starting from a thoroughly mixed raw mix of $BaF_2$, $SrF_2$, $EuF_3$ and $NH_4Br$ in appropriate amounts.

The first firing was performed for 2 h 40 min at 850° C. in a 100% argon gas atmosphere. The resulting material was milled in such a way that the average particle size was 10 μm but the powder was not classified at that stage.

The second firing was performed for 4 h at 750° C. in 99.8% by volume of $N_2$ and 0.2% by volume of $H_2$. As a result, after said second firing a phosphor powder was obtained with an average particle diameter of 12 μm and a very broad particle size distribution.

Classification of this untreated phosphor powder material to remove the very fine particles was tried on an ALPINE 50 ATP (tradename) air classifier. This, however, resulted in a phosphor powder showing a sensitivity loss by a factor 2.

In accordance with the present invention 4 batches of 1 kg each of the untreated phosphor powder were then dispersed each in 4 liters of 0.03 molar solution of palmitic acid in an ethanol-water mixture (80/20 by voluble). The dispersions were stirred vigourously for 2 h.

After settling of the powders, the supernatant liquid was removed. The settled powders were stirred again in 4 liters of pure ethanol and allowed to settle again whereupon after removing the Supernatant liquid they were dried at 60° C.

The four batches of 1 kg each of thus treated phosphor powder were combined again and classified with the already mentioned ALPINE 50ATP (tradename) air classifier to remove the very fine phosphor powder particles. As a result the average particle size increased from 12 to 13 $\mu$m.

The F.O.M. of the phosphor powder being a measure for the phosphor sensitivity increased from 3,800 to 4,800 $10^{-9}$/mR/mm, which proves the more effective classification obtained by the pre-treatment according to the present invention.

What is claimed is:

1. A method for preparing photostimulable barium and/or strontium containing halide phosphor particles of a selected particle size range wherein said method comprises the steps of:
    (1) firing raw mixture materials of said phosphor to produce a sintered phosphor mass that is pulverized,
    (2) mixing said pulverized phosphor mass, optionally after one or more further firings, in a liquid mainly containing a water-miscible organic solvent with an organic acid dissolved therein, said acid being capable of forming with barium and/or strontium contained in the phosphor a salt the solubility of which in water at 20° C. is less than 0.5 g per 100 ml, and
    (3) subjecting the thus mixed pulverized phosphor mass in wet and/or in dry state to a separation treatment in order to collect phosphor particles having a grain size smaller than 40 $\mu$m but larger than 2 $\mu$m, said collected phosphor particles exhibiting a higher figure of merit than the phosphor particles prepared as above but where the organic acid is absent from said liquid.

2. Method according to claim 1, wherein the solubility of said acid in water at 20° C. is less than 0.01 g per liter.

3. Method according to claim 1, wherein phosphor particles having a particle size in the range of 5 to 20 $\mu$m are collected.

4. Method according to claim 1, wherein said acid is a monocarboxylic aliphatic acid having at least 8 carbon atoms.

5. Method according to claim 5, wherein said acid is selected from the group consisting of lauric acid, myristic acid, palmitic acid, stearic acid, behenic acid, oleic acid and linoleic acid.

6. Method according to claim 1, wherein said acid is a dicarboxylic acid.

7. Method according to claim 1, wherein said organic solvent is a ($C_1$–$C_4$) alcohol and/or ketone.

8. Method according to claim 1, wherein said solvent is mixed with water up to 20% by volume to the total liquid mass.

9. Method according to claim 1, wherein said separation treatment proceeds by sieving.

10. Method according to claim 1, wherein said separation treatment proceeds by sedimentation and/or classification optionally followed by sieving.

* * * * *